United States Patent
Chennakeshu et al.

(10) Patent No.: US 10,642,332 B2
(45) Date of Patent: *May 5, 2020

(54) TRIGGERING TRANSITION OF A DEVICE BETWEEN STATES

(71) Applicant: BlackBerry Limited, Waterloo (CA)

(72) Inventors: Sandeep Chennakeshu, Austin, TX (US); Jesse William Bennett, Apex, NC (US); Scott Leonard Dill, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,233

(22) Filed: Sep. 27, 2018

(65) Prior Publication Data

US 2019/0025898 A1 Jan. 24, 2019

Related U.S. Application Data

(63) Continuation of application No. 15/231,456, filed on Aug. 8, 2016.

(51) Int. Cl.

| | |
|---|---|
| *G06F 1/3206* | (2019.01) |
| *E05B 47/00* | (2006.01) |
| *G07C 3/00* | (2006.01) |
| *G06F 1/3296* | (2019.01) |
| *G07C 9/00* | (2020.01) |
| *G06F 1/16* | (2006.01) |
| *G06F 1/3234* | (2019.01) |

(52) U.S. Cl.
CPC ............ *G06F 1/3206* (2013.01); *E05B 47/00* (2013.01); *G06F 1/3296* (2013.01); *G07C 3/00* (2013.01); *G06F 1/162* (2013.01); *G06F 1/1618* (2013.01); *G06F 1/1637* (2013.01); *G06F 1/3262* (2013.01); *G06F 1/3265* (2013.01); *G07C 2009/0092* (2013.01)

(58) Field of Classification Search
CPC ...... G06F 1/1618; G06F 1/162; G06F 1/1637; G06F 1/3206; G06F 1/3262; G06F 1/3265; G06F 1/3296; G07C 2009/0092; G07C 3/00; E05B 47/00

See application file for complete search history.

(56) References Cited

U.S. PATENT DOCUMENTS

| | | | |
|---|---|---|---|
| 7,990,270 | B2 | 8/2011 | Mostov |
| 2005/0024207 | A1 | 2/2005 | Schebel |
| 2008/0061963 | A1 | 3/2008 | Schnitz |
| 2009/0015400 | A1 | 1/2009 | Breed |

(Continued)

OTHER PUBLICATIONS

European Patent Office, International Search Report and Written Opinion for PCT/US2017/044674 dated Oct. 24, 2017 (12 pages).

*Primary Examiner* — Terrell S Johnson
(74) *Attorney, Agent, or Firm* — Trop, Pruner & Hu, P.C.

(57) ABSTRACT

In some examples, a controller receives, from a sensor that is part of a device mounted on a moveable platform, measurement data. The controller detects, based on the measurement data, a change in transit motion status of the moveable platform. The controller triggers, in response to detecting the change in transit motion status of the moveable platform, a transition of the device from a first power state to a second, different power state.

16 Claims, 3 Drawing Sheets

(56) References Cited

U.S. PATENT DOCUMENTS

| | | |
|---|---|---|
| 2010/0097208 A1* | 4/2010 | Rosing .................. G06Q 10/087 |
| | | 340/539.13 |
| 2010/0326145 A1 | 12/2010 | Powers |
| 2012/0075139 A1 | 3/2012 | Gagnon |
| 2012/0139206 A1 | 6/2012 | May |
| 2015/0002274 A1* | 1/2015 | Sengstaken, Jr. .. G06K 7/10009 |
| | | 340/10.34 |
| 2015/0107788 A1 | 4/2015 | Mullet |
| 2015/0154427 A1* | 6/2015 | Barnes ............... G06Q 10/0833 |
| | | 340/10.5 |
| 2015/0310716 A1 | 10/2015 | East |
| 2016/0148501 A1 | 5/2016 | Mou |
| 2017/0168631 A1 | 6/2017 | Roberts-Hoffman |

\* cited by examiner

TRIGGERING TRANSITION OF A DEVICE BETWEEN STATES

CROSS REFERENCE TO RELATED APPLICATION

This is a continuation of U.S. application Ser. No. 15/231,456, filed Aug. 8, 2016, which is hereby incorporated by reference.

BACKGROUND

Trucks, tractor-trailers, and tractors connected to chassis carrying containers can be used to transport cargo that includes goods. Trucks, trailers, and containers typically have doors that can be opened to allow access to cargo that is being transported, and closed to secure the items.

BRIEF DESCRIPTION OF THE DRAWINGS

Some implementations of the present disclosure are described with respect to the following figures.

FIG. 1 is a block diagram of a sensor device according to some examples.

FIGS. 2A and 2B are schematic diagrams of a container hauled by a vehicle, the container including a door and a sensor device according to some examples mounted to the door.

FIG. 3 is a state diagram of an operation of a controller according to some examples.

FIG. 4 is a block diagram of a sensor device according to further examples.

FIG. 5 is a flow diagram of an example process of a controller according to some implementations.

FIG. 6 is a block diagram of a controller according to some examples.

DETAILED DESCRIPTION

A moveable platform can be used to carry physical items between different geographic locations. For example, the moveable platform can be a container (that is attached to a tractor), a truck, or a trailer in which the physical items can be stored during shipment. In other examples, the moveable platform can include another type of carrier structure that is able to carry physical items. More generally, the moveable platform can be part of, mounted on, or attached to a vehicle, such as a truck, a tractor, a car, a train, a ship, an airplane, and so forth. It is noted that although the present discussion refers to a moveable platform as a container, techniques or mechanisms according to some implementations of the present disclosure are applicable to other cargo carrying platforms.

An entity such as a shipping company, a manufacturer, a seller of goods, or any other entity may desire to track assets (such as cargo) that are being transported using moveable platforms. To do so, a sensor device can be mounted on a moveable platform. Sensor devices on various moveable platforms can communicate sensor information over a network to a remote service (which can include a server or a collection of servers and associated network equipment) to allow the remote service to track assets that are being moved by various moveable platforms. The server(s) and associated network equipment can be located at one fixed location or in a mobile unit or can be part of a data center or cloud. The tracking can include tracking the current locations of the assets, cargo load status of moveable platforms, conditions of the environment around the assets (where such conditions can include a measured temperature, a measured humidity, etc.), and/or other information.

A sensor device can include a communication component to communicate over a network. In some examples, sensor devices mounted on moveable platforms can be part of a larger network of devices. This larger network of devices can be part of the "Internet-of-Things" (IoT) technology paradigm to allow different types of devices to communicate different types of data (including sensor data, voice data, video data, e-mail data, text messaging data, web browsing data, and so forth).

Sensor devices mounted on moveable platforms can be powered using batteries. To extend the lifetime of a battery for a sensor device, the sensor device can be placed in a sleep state during times when the sensor device does not have to measure data or process data. However, it can be challenging to determine when the sensor device is to be activated from the sleep state to an operational state to allow the sensor device to perform respective measurement and/or processing tasks. A sleep state refers to a state of the sensor device where a sensor device is powered off, or a portion of the sensor device 102 is powered off, such that the sensor device consumes a lower amount of power than another state of the sensor device, such as the operational state. An operational state of the sensor device is a state of the sensor device where the sensor device is able to perform specified tasks, including measurement of data and/or processing of data. In the operational state, the sensor device consumes more power than the power consumed by the sensor device in the sleep state.

If the sensor device is not awakened when certain events occur, then various measurement information corresponding to such events may be missed, and thus, as a result, the tracking of assets being transported by moveable platforms may be incomplete or inaccurate.

In accordance with some implementations of the present disclosure, as shown in FIG. 1, a sensor device 102 that can be mounted on a moveable platform includes a sensor 104 to measure a parameter and to output corresponding measurement data of the parameter. Although FIG. 1 shows just one sensor 104, it is noted that the sensor device 102 can include multiple sensors in other examples, where the multiple sensors can measure different parameters.

The sensor device 102 further includes a controller 106. The controller 106 can be implemented with a hardware processing circuit, such as a microprocessor, a core of a multi-core microprocessor, a microcontroller, a programmable gate array, a programmable integrated circuit device, or any other type of hardware processing circuit. Alternatively, the controller 106 can be implemented as a combination of a hardware processing circuit and machine-readable instructions executable on the hardware processing circuit.

The controller 106 determines, based on the measurement data output by the sensor 104, whether a moveable platform on which the sensor device 102 is mounted is in transit motion. Transit motion of a moveable platform refers to motion of the moveable platform that causes the moveable platform to be moved between different physical locations. It is noted that in some cases, the sensor device 102 may be attached to a door or other entry barrier on the moveable platform, where the entry barrier can be moved between an open position and a closed position. The movement that is detected by the sensor device 102 that corresponds to the movement of such an entry barrier may not correspond to a transit motion of the moveable platform on which the sensor device 102 is mounted, because the moveable platform may remain stationary even though the entry barrier is being moved between an open position and a closed position. Generally, an entry barrier (or more simply a barrier) can refer to any structure, such as a door, a window, or any other structure that can be opened to allow entry through an opening, or closed to block entry through the opening.

In response to determining that the moveable platform on which the sensor device 102 is mounted is in transit motion, the controller 106 can activate an awaken indication 108 to cause the sensor device 102 to transition from a sleep state to an operational state. The awaken indication 108 can include a signal that has an active state (e.g., logic high or logic low), and an inactive state (e.g., logic low or logic high). Activating the signal refers to asserting the signal to the active state. In other examples, the awaken indication 108 can include a message, an information element, or any other type of indication.

Activation of the awaken indication 108 causes certain device component(s) 110 of the sensor device 102 to be activated from a lower power state to a higher power state. As discussed further below, such device component(s) 110 can include one or more of the following: a processor, another sensor, a communication component (e.g., a wireless transceiver and associated circuits to communicate wirelessly over a wireless network, or a wired transceiver and associated circuits to communicate over a wired network), and so forth. A lower power state of a device component refers to a state where the device component consumes less power than a higher power state of the device component. For example, to set the device component in the lower power state, the device component (or a portion of the device component) can be turned off, or can be run at a lower clock frequency, or can be run at a lower power supply voltage level.

Figure 2A:
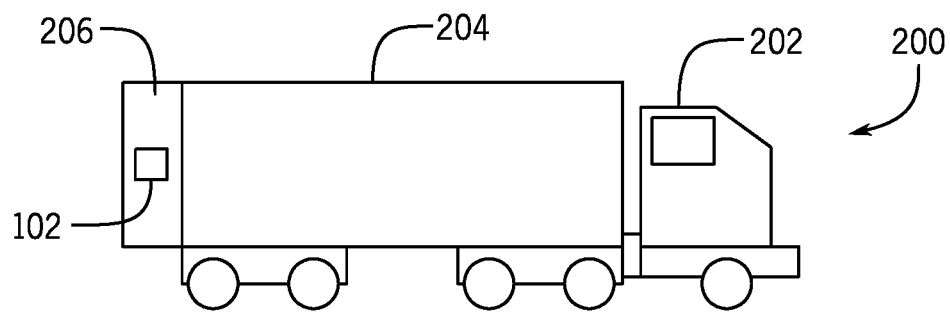
Figure 2B:
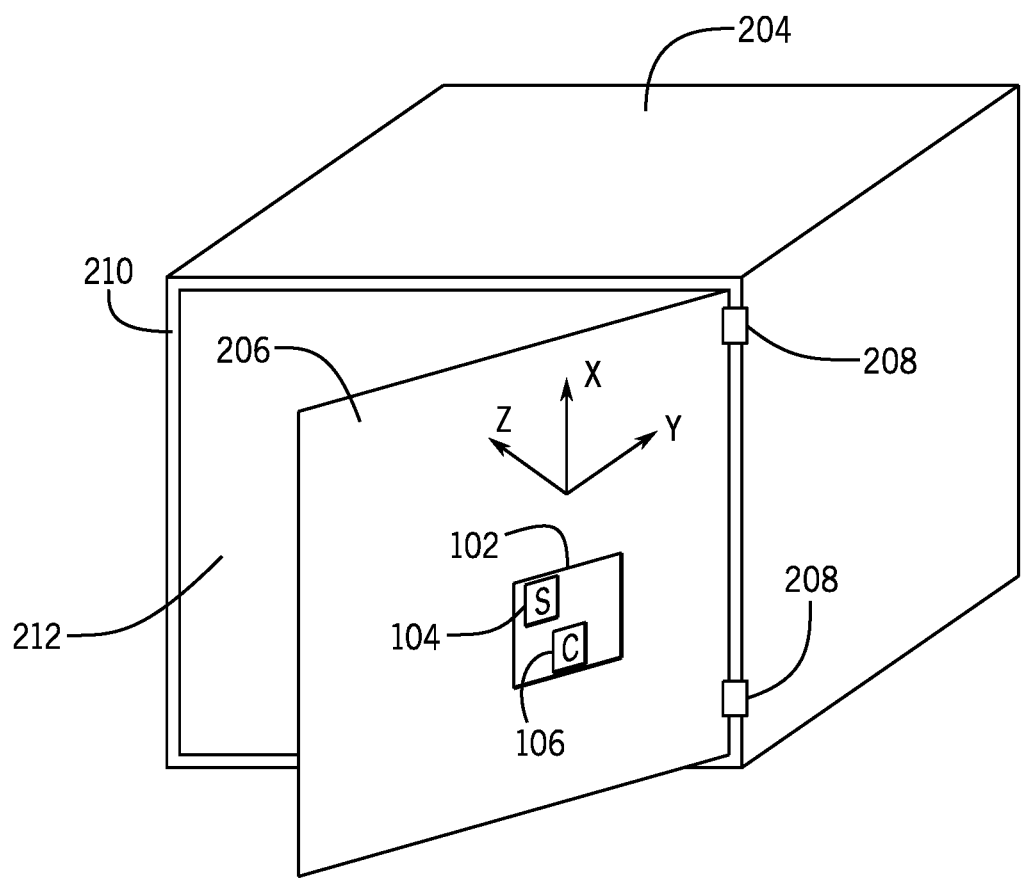

FIG. 2A illustrates an example truck 200 that includes a tractor unit 202 and a container 204 (provided on a chassis) hauled by the tractor unit 202. FIG. 2B is a perspective view of the container 204. The container 204 is an example of a moveable platform that can be used to carry physical items. The container 204 includes a door 206 that is pivotable between an open position and a closed position. In FIGS. 2A-2B, the door 206 is in the open position.

In the ensuing discussion, reference is made to examples where a moveable platform is the container 204, and where an entry barrier is the door 206. It is noted that techniques or mechanisms according to some implementations of the present disclosure can be applied with sensor devices used with other types of moveable platforms and entry barriers.

The door 206 is pivotally mounted on hinges 208, which are attached to a frame 210 (referred to as "door frame") of the container 204. The door 206 is able to rotate about the hinges 208 between the open position and the closed position. In FIG. 2A, two hinges 208 are shown. In other examples, the door 206 can be mounted on just one hinge, or on more than two hinges.

In some examples, the sensor device 102 is attached to the door 206. The sensor device 102 can be mounted to an outer surface of the door 206 that faces the environment outside the container 204, or alternatively, the sensor device 102 can be mounted to an inner surface of the door 206 that faces into an inner chamber 210 of the container 204. In yet further examples, the sensor device 102 can be provided within a recess in the wall of the door 208. In other examples, the sensor device 102 can be mounted elsewhere on the container 204.

In FIG. 2B, three axes are defined: X, Y, and Z. In the view of FIG. 2B, the X axis points generally upwardly, which in the view of FIG. 2B is generally parallel with a rotation axis of each hinge 208. The door 206 is rotatable about the rotation axis of the hinge 208. The Y axis is a radial axis that is perpendicular to the X axis. In the view shown in FIG. 2B, the Y axis is parallel to the main surface of the door 206 and points towards the hinges 208. The Z axis is in a direction that is normal to the main surface of the door 206; when the door 206 is in the closed position, the Z axis points into the inner chamber 212 of the container 204.

Although reference is made to the X axis as pointing upwardly in the view shown in FIG. 2B, it is noted that in other examples, the X axis can point in a different direction. More generally, the X axis is parallel to the rotation axis of a hinge about which the door 206 is rotatably mounted. Thus, in a different example, a hinge of the door 206 can be mounted such that its rotation axis extends along a horizontal axis, or along a diagonal axis. In other examples, rolling doors that move up and down do not have hinges but have rollers or other mechanisms to move up and down.

In some implementations, the sensor 104 of the sensor device 102 includes an accelerometer that can measure acceleration data representing an acceleration of the sensor device 102. In the ensuing discussion, reference is made to the "accelerometer 104." Note, however, that in other examples, the sensor 104 can be implemented with a different type of sensor that can measure displacement or velocity. A determination of whether the container 204 is in transition motion can be based on the acceleration data from the accelerometer 104 (and possibly other sensor data as discussed further below).

Figure 1:
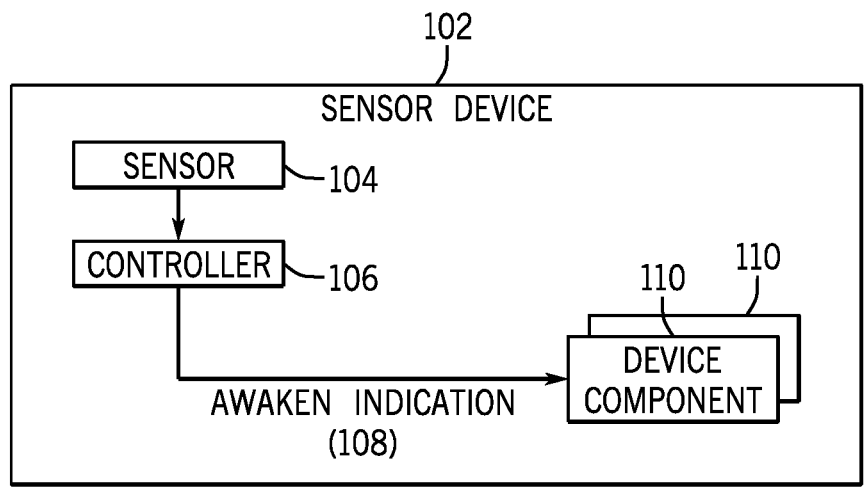

Although just one accelerometer 104 is shown in FIGS. 1 and 2B, it is noted that in other examples, multiple accelerometers 104 can be used to output acceleration data that can be processed to determine whether or not the moveable platform on which the sensor device 102 is mounted is in transit motion.

Velocity and position of the sensor device 102 (and corresponding velocity and position of the container 204 on which the sensor device 102 is mounted) can be estimated based on the acceleration data from the accelerometer 104. In some examples, the acceleration data from the accelerometer 104 can be integrated to obtain velocity and position. A single integration over time can be applied on the acceleration data to obtain velocity, and a double integration over time can be applied on the acceleration data to obtain position. From the velocity and position information derived based on the acceleration data, the controller 106 can decide whether or not the moveable platform on which the sensor device 102 is mounted is in transit motion. For example, if the detected velocity lasts for longer than a specified time duration, and if positions calculated at different times from the acceleration data indicate that the moveable platform has in fact moved between different locations, then the controller 106 can indicate that the container 204 is in transit motion.

In some examples, the accelerometer 104 can be a multi-axis accelerometer that can measure acceleration along each of the X, Y, and Z axes. In other examples, the accelerometer 104 can measure acceleration in a subset of the X, Y, and Z axes.

Figure 3:
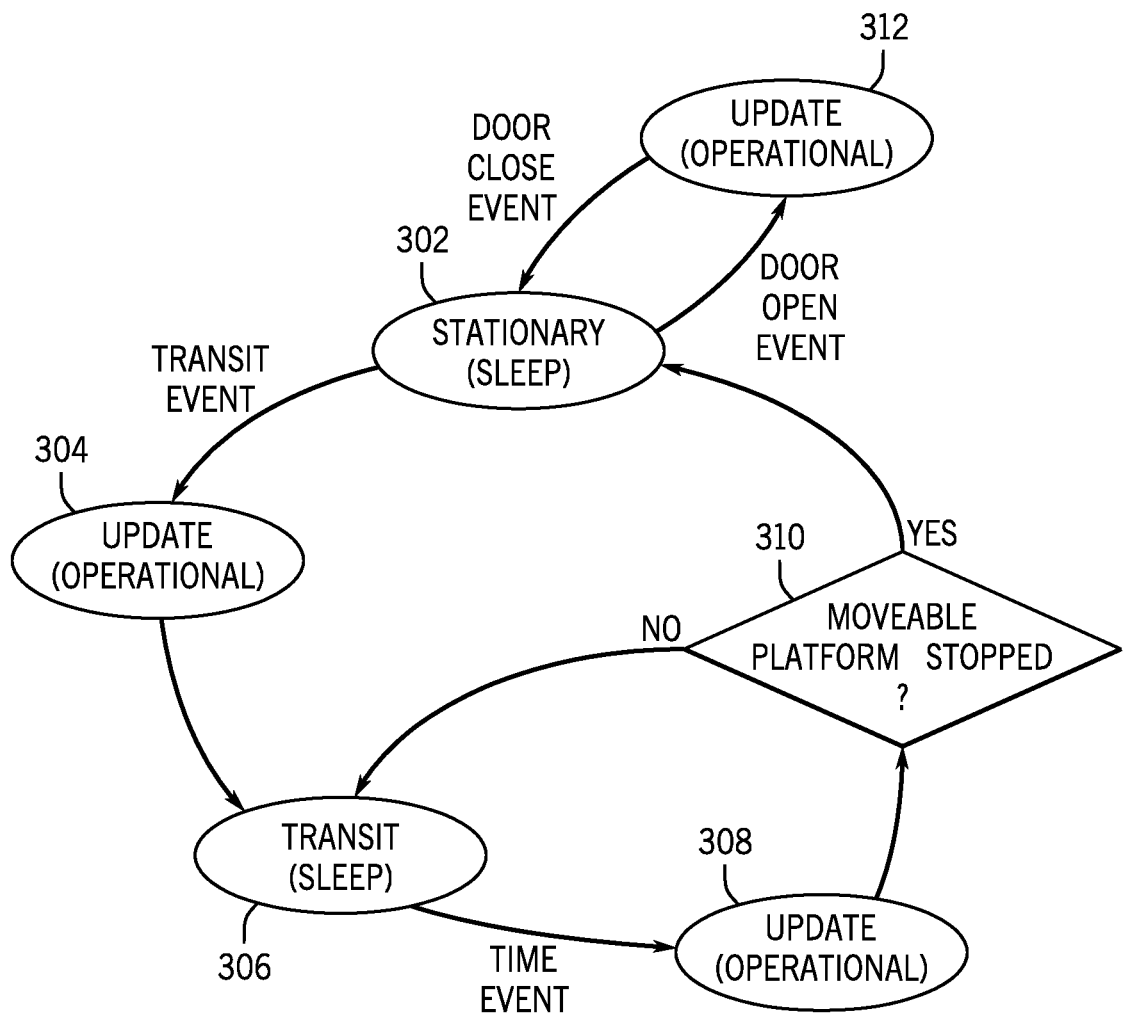

FIG. 3 is a state diagram that illustrates operation of the controller 106 according to some examples. While the container 204 is stationary (which can be determined based on the acceleration data from the accelerometer 104), the controller 106 remains in a stationary state 302. In the stationary state 302, the sensor device 102 is maintained in the sleep state.

The controller 106 can transition from the stationary state 302 in response to one of several different events. A first event that can cause the controller 106 to exit the stationary state 302 is a transit event. The transit event is triggered in response to the controller 106 detecting, based on acceleration data from the accelerometer 104, that the container 204 on which the sensor device 102 is mounted has started transit motion (i.e., started moving from being stationary).

In response to the transit event, the controller 106 transitions from the stationary state 302 to an update state 304, where the controller 106 triggers a power state transition in the sensor device 102. More specifically, the controller 106 triggers the sensor device 102 to transition from the sleep state to the operational state. In response to transitioning the sensor device 102 to the operational state, the sensor device 102 can make measurements using the sensor(s) (in addition to the accelerometer 104) in the sensor device 102, and can perform data processing using a processor in the sensor device 102. Moreover, in the update state 304, a communication component may be activated to allow the sensor device 102 to transmit information to (and receive information from) a remote entity over a network. The remote entity can be a remote service that is used to track assets that are being transported by moveable platforms. In other examples, the remote entity can be a different destination device.

The controller 106 then transitions from the update state 304 to a transit state 306, which corresponds to a state of the controller 106 when the container 204 on which the sensor device 102 is mounted is in transit motion. In the transit state 306, the controller 106 triggers the sensor device 102 to transition from the operational state back to the sleep state. While the container 204 remains in transit motion, the sensor device 102 can be maintained generally in the sleep state since data measurement and/or data processing does not have to be performed while the container 204 is continually in motion. However, in some implementations, the sensor device 102 can be intermittently activated (e.g., periodically activated or activated at irregular intervals) while the container 204 is in motion.

As shown in FIG. 3, in response to a time event, the controller 106 transitions from the transit state to an update state 308. In the update state 308, the controller 106 triggers a power state transition in the sensor device 102 to cause the sensor device 102 to transition from the sleep state to the operational state. In the update state 308, one or more of the following device components in the sensor device 102 can be activated from a lower power state to a higher power state: the processor, sensor(s) (in addition to the accelerometer 104), the communication component, and so forth.

The time event can be generated in response to expiration of a timer in the sensor device 102. For example, the timer can count a specified time duration, and upon expiration of the time duration, the timer activates a timeout indication to cause the time event to be produced.

From the update state 308, the controller 106 determines (at 310) whether the container 204 has come to a stop after being in transit motion. The determination of whether the container 204 has come to a stop can be based on the acceleration data (and possibly other sensor data as discussed further below). The container 204 is considered to have come to a stop if the container 204 is detected to be stationary for a specified time duration (e.g., several seconds).

If the container 204 has not come to a stop from being in transit motion, the controller 106 transitions back to the transit state 306, and causes the sensor device 102 to transition from the operational state to the sleep state.

However, if the controller 106 determines (at 310) that the container 204 has come to a stop after being in transit motion, the controller 106 transitions to the stationary state 302, and causes the sensor device 102 to transition from the operational state to the sleep state.

Another event that can cause the controller 106 to exit the stationary state 302 is a door open event. In response to a door open event (detected when the door 206 is opened from a closed position), the controller 106 transitions from the stationary state 302 to an update state 312, where the controller triggers the sensor device 102 to transition from the sleep state to the operational state. In the update state 312, one or more of the following device components in the sensor device 102 can be activated from a lower power state to a higher power state: the processor, sensor(s) (in addition to the accelerometer 104), the communication component, and so forth.

In some examples, while the door remains open, the sensor device 102 can remain in the operational state. In response to a door close event (corresponding to the door being closed from the open position), the controller 106 transitions back to the stationary state 302, and triggers the sensor device 102 to transition from the operational state to the sleep state.

The door open event is produced in response to detecting that the door has been moved from a closed position to an open position. The detection of the door being opened can be based on use of any various different techniques. For example, a switch can be attached to the door, where the switch changes state in response to the door being opened. As another example, a magnetic sensor can be used, where the magnetic sensor can be in proximity to a magnet when the door is closed, but when the door is opened, the magnetic sensor moves away from the magnet. The magnetic sensor can thus output different values depending upon whether the door is opened or closed. In other examples, acceleration data from the accelerometer 104 and rotation data from a rotation sensor (discussed further below) can be used for detecting the door being opened and closed.

In other examples, a further event that can cause the controller 106 to exit the stationary state 302 is a door close event. In response to a door close event (detected when the door 206 is closed from an open position), the controller 106 transitions from the stationary state 302 to an update state, where the controller triggers the sensor device 102 to transition from the sleep state to the operational state. Subsequently, in response to a door open event (corresponding to the door being opened from the closed position), the controller 106 transitions back to the stationary state 302, and triggers the sensor device 102 to transition from the operational state to the sleep state.

Thus, more generally, a door change event (representing a door being moved between an open position and a closed position) can cause the controller 106 to transition from the stationary state 302 to an update state (e.g., 312). A door being moved between an open position and a closed position can refer to the door being opened or the door being closed. A subsequent door change event causes the controller 106 to transition from the update state back to the stationary state 302.

In yet further examples, other events can cause transitions between different states.

It is noted that the sleep state of the sensor device 302 while the controller 106 is in the stationary state 302, and the sleep state of the sensor device 302 while the controller is in the transit state 306, may not be the same. For example, a device component (or multiple device components such as the processor, other sensor(s), and the communication component) of the sensor device 102 may be activated in the sleep state corresponding to the transit state 306, but may be inactivated in the sleep state corresponding to the stationary state 302, or vice versa.

Similarly, the operational state of the sensor device 302 corresponding to the update states 304, 308, and 312 may be different. For example, some device component(s) of the sensor device 102 may be inactivated in one of the update states 304, 308, and 312, but may be activated in another of the update states 304, 308, and 312.

Figure 4:
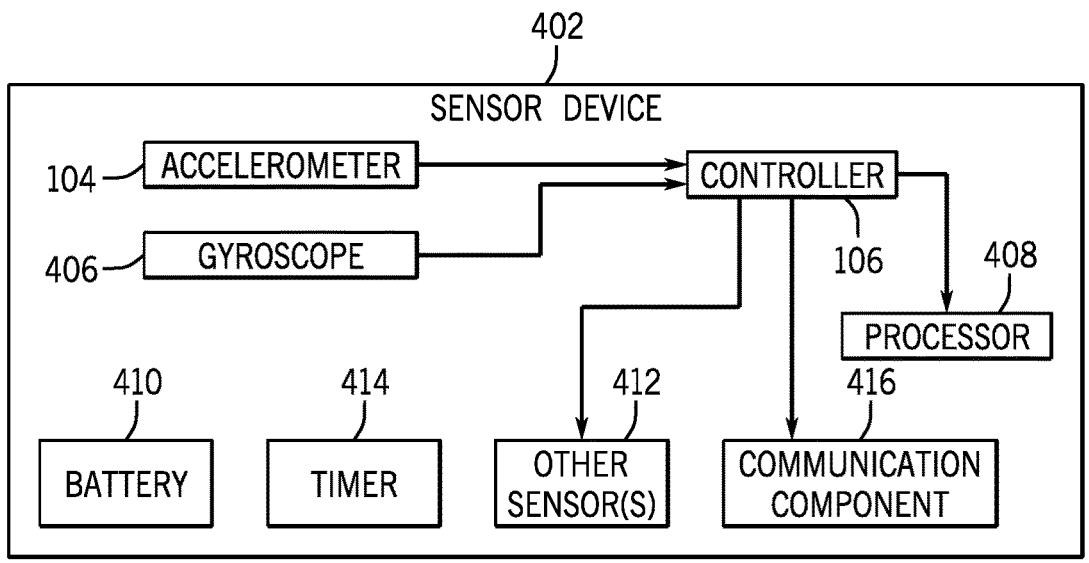

FIG. 4 is a block diagram of a sensor device 402 according to further implementations. The sensor device 402 includes the accelerometer 104 and a gyroscope 406. The gyroscope 406 is an example of a rotation sensor that is used to measure rotation about each of one or more axes (such as the X, Y, and Z axes of FIG. 2B). More specifically, a rotation sensor can measure a rotation speed or rate of rotation about each respective axis. In other examples, instead of a gyroscope, a rotation sensor can be implemented using a rotation vector sensor, where a rotation vector produced by the rotation vector sensor represents the orientation of the rotation vector sensor as a combination of an angle and an axis, in which a device has been rotated through an angle around a specific axis.

The accelerometer 104 produces acceleration data, and the gyroscope 406 produces rotation data. The acceleration data and the rotation data are provided as inputs to the controller 106.

The sensor device 402 further includes a processor 408, other sensor(s) 412, and a communication component 416, which are examples of the device components 110 shown in FIG. 1. The sensor device 402 further includes a battery 410 that provides power to the components of the sensor device 402.

Based on the acceleration data and the rotation data, the controller 106 can make any one or more of the following determinations: (1) detect that the container 204 on which the sensor device 402 is mounted has started transit motion from a stationary position, and (2) detect that the door 206 of the container 204 has been opened or closed.

In response to detecting that the container 206 has started transit motion, or in response to detecting that the door 206 has been opened from a closed position, the controller 106 can activate one or more of the following device components to place the sensor device 402 in the operational state: the processor 408, the other sensor(s) 412, and the communication component 416.

When activated from a lower power state to a higher power state, the processor 408 can perform various data processing tasks, such as by analyzing measurement data from the accelerometer 404, the gyroscope 406, and the other sensor(s) 412 to make certain estimates and/or predictions. The other sensor(s) 412 when activated from a lower power state to a higher power state can take a respective measurement(s), such as to measure a temperature in the container 204, measure a humidity in the container 204, measure a time of flight of a signal inside the container 204 (where a signal, such as a light signal, is emitted from an emitter, and a reflection of the signal is detected by a detector to measure a time of flight), and/or measure another parameter.

The sensor device 402 further includes a timer 414, which can be activated to count a specified time duration. For example, the timer 414 can be used to trigger the time event to cause the transition from the transit state 406 to the update state 408 shown in FIG. 3.

In some examples, the controller 106 is separate from the processor 408. In alternative examples, the controller 106 and the processor 408 can be integrated into one electronic component, such as an integrated circuit chip or a circuit board.

To determine whether the container 206 has started transit motion based on the acceleration data from the accelerometer 104 and the rotation data from the gyroscope 406 (or other type of rotation data), the controller 106 can check whether the rotation data indicates rotational movement of the sensor device 402 in response to detecting based on the acceleration data that the sensor device 402 is in motion. If the rotation data indicates that the sensor device 402 is experiencing rotational movement (due to opening or closing of the door 206), then that is an indication that motion indicated by the acceleration data measured by the accelerometer 104 is due to the door 206 moving. As a result, in scenarios where both the acceleration data and the rotation data indicate movement of the sensor device 402, the controller 106 can make a determination that the door 206 is moving, but the container 206 is not in transit motion.

However, if just the acceleration data is indicating movement, but the rotation data is not indicating movement, then the controller 106 can make a determination that the container 206 is in transit motion.

Figure 5:
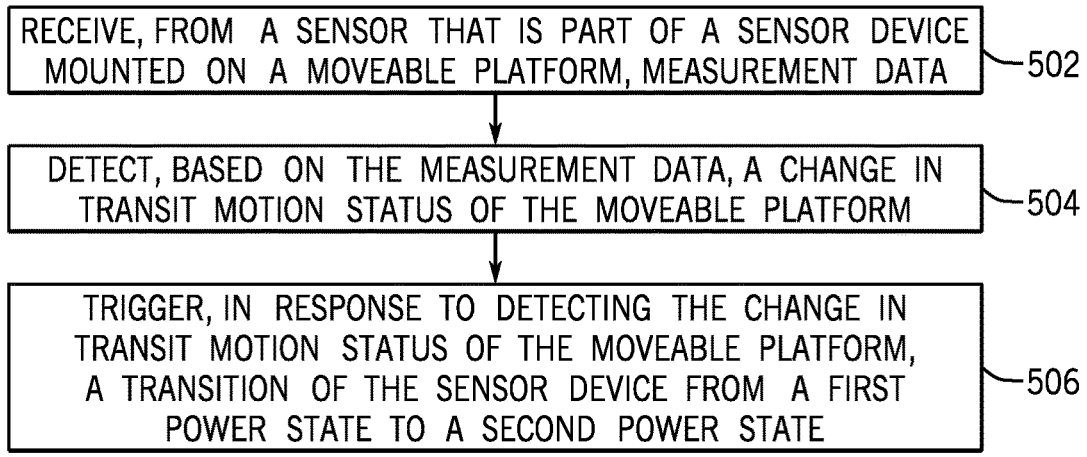

FIG. 5 is a flow diagram of a process that can be performed by the controller 106 according to some examples. The controller 106 receives (at 502) from a sensor (e.g., the sensor 104 of FIG. 1 or FIG. 4, and/or the gyroscope 406 of FIG. 4) that is part of a sensor device (e.g. 102 in FIG. 1 or 402 in FIG. 4) mounted on a moveable platform (e.g., the container 204 of FIGS. 2A-2B), measurement data. The controller 106 detects (at 504), based on the measurement data, a change in transit motion status of the moveable platform. The change in transit motion status can be a change from the moveable platform being stationary to the moveable platform being in transit motion, or vice versa.

The controller 106 triggers (at 506), in response to detecting the change in transit motion status of the moveable platform, a transition of the sensor device from a first power state to a second, different power state.

Figure 6:
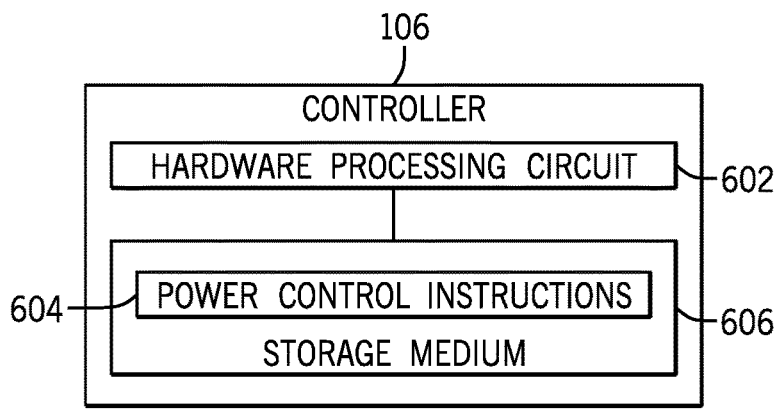

FIG. 6 is a block diagram of the controller 106 according to some examples. As noted above, in some examples, the controller 106 can be implemented using a hardware processor circuit. In other examples, as shown in FIG. 6, the controller 106 can include a combination of a hardware processing circuit 602 and machine-readable instructions executable on the hardware processing circuit 602. The machine-readable instructions include power control instructions 604 stored in a non-transitory machine-readable or computer-readable storage medium 606. The power control instructions 604 can be loaded and executed on the hardware processing circuit 602 to perform respective tasks, such as the tasks of the controller 106 described in the present disclosure.

The storage medium 606 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed or removable disks; or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device having a sleep state and an operational state and for mounting on a platform, comprising:
    an accelerometer to output acceleration data; and
    a controller to:
        determine, based on the acceleration data output by the accelerometer, a velocity of the device;
        in response to determining that the velocity has lasted more than a predefined time duration, determine that the platform on which the device is mounted has started transit motion;
        in response to determining that the platform on which the device is mounted has started transit motion, trigger the device to transition from the sleep state to the operational state;
        determine whether an entry barrier to which the device is attached has been moved between an open position and a closed position; and
        in response to determining that the entry barrier to which the device is attached has been moved between the open position and the closed position, trigger the device to transition from the sleep state to the operational state.

2. The device of claim 1, wherein the controller is to further:
    determine positions of the platform at different times based on the acceleration data,
    wherein a determination that the platform has started transit motion is further based on the determined positions.

3. The device of claim 1, further comprising:
    a rotation sensor to output rotation data,
    wherein the controller is to determine that the entry barrier has been moved between the open position and the closed position based on the rotation data.

4. The device of claim 3, wherein the device is for attachment on the entry barrier of a container on the platform, the entry barrier being rotatable between the open position and the closed position, and
    wherein the controller is to determine that the platform has started transit motion based on the velocity indicating movement of the platform and the rotation data indicating that the device is not experiencing rotational movement.

5. The device of claim 1, wherein the controller is to further:
    in response to determining that the platform on which the device is mounted has not started transit motion, maintain the device in the sleep state.

6. The device of claim 1, wherein the controller is to further:
    when the device is in the operational state, determine, based on further acceleration data output by the accelerometer, whether the platform has stopped after being in transit motion; and
    in response to determining that the platform has stopped after being in transit motion, trigger the device to transition from the operational state to the sleep state.

7. The device of claim 1, further comprising a processor that has a lower power state and a higher power state, wherein the device is in the sleep state responsive to the processor being in the lower power state, and the device is in the operational state responsive to the processor being in the higher power state.

8. The device of claim 7, wherein the triggering of the device to transition from the sleep state to the operational state comprises triggering the processor to transition from the lower power state to the higher power state.

9. A method comprising:
    determining, by a controller based on acceleration data output by an accelerometer, a velocity of a device that has a sleep state and an operational state and that is mounted on a platform;
    receiving, by the controller from a rotation sensor, rotation data;
    in response to determining that the velocity has lasted more than a predefined time duration, and based on the rotation data from the rotation sensor, determining, by the controller, that the platform on which the device is mounted has started transit motion; and
    in response to determining that the platform on which the device is mounted has started transit motion, triggering, by the controller, the device to transition from the sleep state to the operational state.

10. The method of claim 9, further comprising:
    determining, by the controller, positions of the platform at different times based on the acceleration data,
    wherein determining that the platform has started transit motion is further based on the determined positions.

11. The method of claim 9, wherein the device is attached to an entry barrier of a container on the platform, the entry barrier rotatable between an open position and a closed position, and
    wherein determining that the platform has started transit motion is based on the velocity indicating movement of the platform and the rotation data indicating that the device is not experiencing rotational movement.

12. The method of claim 11, further comprising:
    detecting, based on the rotation data indicating rotational movement of the device, that the entry barrier has been moved between the open position and the closed position; and
    triggering, by the controller in response to detecting that the entry barrier has been moved between the open position and the closed position, a transition of the device from the sleep state to the operational state.

13. The method of claim 9, wherein triggering the device to transition from the sleep state to the operational state comprises triggering at least one device component of the device to transition from a lower power state to a higher power state, wherein the at least one device component is selected from among a processor, another sensor, and a communication component.

14. A non-transitory machine-readable storage medium storing instructions that upon execution cause a controller to:
    determine, based on acceleration data output by an accelerometer, a velocity of a device that has a sleep state and an operational state and that is mounted on a platform;
    receive, from a rotation sensor, rotation data;
    in response to determining that the velocity has lasted more than a predefined time duration and based on the rotation data from the rotation sensor, determine that the platform on which the device is mounted has started transit motion; and
    in response to determining that the platform on which the device is mounted has started transit motion, trigger the device to transition from the sleep state to the operational state.

15. The non-transitory machine-readable storage medium of claim 14, wherein the instructions upon execution cause the controller to:
    determine positions of the platform at different times based on the acceleration data,
    wherein determining that the platform has started transit motion is further based on the determined positions.

16. The non-transitory machine-readable storage medium of claim 14, wherein the device further comprises a device component having a lower power state and a higher power state, and wherein triggering the transition of the device from the sleep state to the operational state comprises triggering a transition of the device component from the lower power state to the higher power state.

\* \* \* \* \*